United States Patent [19]

Page et al.

[11] Patent Number: 4,525,322

[45] Date of Patent: Jun. 25, 1985

[54] ETHYLENE POLYMER COMPOSITION FOR BLOW MOLDING

[75] Inventors: Matthew A. Page; William J. Libbey; Allan J. Lundeen, all of Ponca City, Okla.

[73] Assignee: E. I. Du Pont de Nemours and Company, Wilmington, Del.

[21] Appl. No.: 508,696

[22] Filed: Jun. 28, 1983

[51] Int. Cl.$^3$ ............................................. C08L 23/06
[52] U.S. Cl. .................................. 264/531; 264/535; 525/240
[58] Field of Search ................. 264/531, 535; 525/240

[56] References Cited

U.S. PATENT DOCUMENTS

| 3,392,213 | 7/1968 | Berger | 525/243 |
| 4,336,352 | 6/1982 | Sakurai et al. | 525/240 |
| 4,357,448 | 11/1982 | Tsubaki et al. | 526/66 |

Primary Examiner—Paul R. Michl
Attorney, Agent, or Firm—Cortlan R. Schupbach

[57] ABSTRACT

Polyethylene blends for blow molding processes are disclosed, comprising from 12 to 25 weight percent of high molecular weight component, 5 to 83 weight percent of a medium molecular weight component, and 5 to 83 weight percent of the low molecular weight component, wherein the ratio of high molecular weight to medium molecular weight is greater or equal to 1.7 and the ratio of medium molecular weight to low molecular weight is greater or equal to 1.7, and wherein the blend has a melt index in the range of 0.01 to 2.0.

7 Claims, No Drawings

ETHYLENE POLYMER COMPOSITION FOR BLOW MOLDING

This invention relates to ethylene resin compositions particularly suitable for blow molding applications. More particularly, this invention relates to ethylene polymer compositions and process for preparing such compositions in the obtaining of a polymer particularly suited for intermittent blow molding applications.

Polyethylene characteristics required for molding useful articles and the like vary depending upon the method of molding and the end use to which the material is to be put. As is known in the art, various properties of polymers must be designed to fit particular molding processes and designed to withstand the end use to which the product of the process is to be put.

It is well known that polymers having low molecular weight together with a narrow molecular weight distribution are suitable for articles molded by injection molding processes. In contrast, blow molding processes require polymers having relatively high molecular weights and broad molecular weight distributions.

Polymers utilized for these purposes must provide excellent physical properties with regard to the balance of stiffness and environmental stress cracking resistance (ESCR) as well as esthetics such as color, top load (or stacking ability) while providing strength and chemical resistance with a low wall thickness.

While many polymers have been produced to fulfill these desirable characteristics, normally such polymers have severe faults which continually plague production processes. Polymers produced by mixing high molecular weight polyethylenes with low molecular weight polyethylenes, while providing many desirable characteristics, generally have lower die swell, lower melt tension and produce large amounts of gels or faults during molding.

In blow molding processes, bottles are formed from cylindrical molten polymer tubes extruded from a machine, each of which have a length suitable for the ultimate application. These extruded cylinders are called "parisons".

In continuous blow molding applications, the parison is continuously being extruded at a constant rate. On the other hand, the intermittent blow molding process involves the collection of molten polymer in a reservoir inside the machine followed by the rapid extrusion of the parison by a ram. While the parison is extruded from a continuous blow molding machine over the entire cycle time of the previous article molded, the intermittent blow molding machine extrudes the parison in a small fraction of the cycle time.

The parison is extruded more rapidly in intermittent blow molding than it is in continuous blow molding; consequently, the shear rates that are encountered by polymers in intermittent blow molding are much higher than they are in continuous blow molding.

In both cases, after the mold has retrieved the appropriate length of the parison, air is injected into the inside of the mold which forces the molten polymer against the mold to form the article. After the polymer has cooled to form the article, the mold opens, ejects the finished article and retrieves a fresh length of parison to repeat the cycle.

The physical property advantages inherent in the resins of the present invention in products made by intermittent blow molding processes will also be present in continuous blow molding. However, the processing property advantages observed in intermittent blow molding applications, which require much more closely controlled processing properties, are less evident in the continuous extrusion processes.

Thus it can be seen that polyethylene consumers use many different grades of polyethylene to meet various product requirements. Usually, polyethylene produced by mixing high molecular weight and low molecular weight polyethylene has low die swell. As a result, materials made from these polymers have a low wall thickness. Low gel levels in such low wall thicknesses become increasingly important, since a gel is a discontinuity in a normally uniform surface. Thus, the balance of properties such as low gels, proper die swell, high ESCR, topload and esthetics is normally very difficult to obtain, since a gain in one area means a corresponding loss in other areas.

It would therefore be of great benefit to provide a polymer composition which is suitable for blow molding applications which provide advantages in critical polymer property areas while substantially maintaining desirable polymer processing properties.

We have now discovered that a polyethylene blend particularly suitable for intermittent blow molding applications and providing good die swell, low gel content and high extrusion rate, together with polymer stability can be obtained from polyethylene resins prepared from Ziegler/Natta catalysts containing high molecular weight, medium molecular weight and low molecular weight fractions, wherein the resin comprises (a) a high molecular weight component with a viscosity average molecular weight (H-MW) ranging from about 590,000 to about 860,000, and preferably from 660,000 to 775,000, and comprising from about 12 to about 25% by weight of the total resin; (b) a medium molecular weight component having a molecular weight (M-MW) from about 75,000 to about 600,000 and comprising from about 5 to 83% by weight of the total resin; (c) a low molecular weight component having a molecular weight (L-MW) from about 10,000 to about 100,000 and comprising from about 5 to about 83% by weight of the total resin, wherein (d) the ratio of H-MW/M-MW is greater than or equal to 1.7 and the ratio of M-MW/L-MW is greater than or equal to 1.7 and wherein the density of the total resin is from about 0.940 to about 0.970 and the melt index at a 2.16 kilogram load of the total resin is from about 0.01 to about 2.0.

The resin described above comprises polyethylene homopolymer and/or polyethylene copolymers in any fraction wherein the copolymer is formed from ethylene and a comonomer containing from 3 to 12 carbon atoms.

Attempts have been made to produce ethylene polymers which provide properties as described. Representative but non-exhaustive examples of such references are U.S. Pat. No. 4,336,352 which deals with three component polyethylene serials. This patent teaches that the high molecular weight component cannot exceed 10% by weight of the polymer. However, this resin has a severe disadvantage in low extrusion rates, since the limitation on high molecular weight component largely decreases the rate of material which can be extruded uniformly. Japanese Kokai 57-141409 discloses a three component process which has a high molecular weight component ranging up to over 50% of the total resin composition. However, tests have shown that the molecular weight of the high molecular weight component of this particular blend is so high that gels become a problem and thin wall bottles become difficult to produce with any degree of uniformity.

During the intermittent blow molding process, the extruded parison tends to swell in both the outer dimension and the wall thickness. This swelling has been termed in various places die swell, the Barus effect and the memory effect. We refer to this phenomenon of the swelling of the outer dimension as flare swell and to the swelling of the wall thickness as weight swell.

These are certain desirable levels of flare swell and weight swell for intermittent blow molding resins. One fault of earlier two component samples of Ziegler/Natta resins reported in the literature (U.S. Pat. No. 4,336,352) is that the weight swell was too low. In addition, the extrusion rate at high shear rates was also inadequate, leading to lowered moldability.

The present invention provides a composition and a method capable of overcoming these processing faults. In addition, the composition described herein yield resins with superior physical properties with Ziegler/Natta resins as compared to conventional chromium based blow molding resins. The environmental stress cracking resistance (ESCR), impact strength and topload strength are far superior to many commercial resins. These samples, in general, show a superior impact strength at comparable topload values. Conversely, if ESCR values are held constant, the topload strength of these resins is superior to conventional blow molding resins. A process for producing these compositions is also disclosed.

Processes for producing polyethylene in multi-step polymerizations are well known. U.S. Pat. No. 3,392,213 teaches utilization of the same catalyst in multiple reactors in order to produce higher molecular weight polymers. U.S. Pat. No. 4,357,448 shows a two-step process for polymerizing ethylene. These patents are only representative of the many in the art which teach such processes and suitable Ziegler/Natta catalysts for producing such materials.

However, the present invention consists of a blend of three polyethylene components, each containing, respectively, high molecular weight, medium molecular weight and low molecular weight fractions, each component selected from the group consisting of ethylene homopolymers and copolymers of ethylene and an olefin having from 3 to 12 carbon atoms. The high molecular weight fraction comprises from 12 to 25 percent, preferably from 16 to 22 percent by weight of the total resin and has a molecular weight (H-MW) ranging from about 590,000 to about 860,000, and preferably from 660,000 to 775,000.

The medium molecular weight component comprises from about 5 to 83 percent by weight, preferably from about 20 to 35 percent by weight of the total resin and has a molecular weight (M-MW) from about 75,000 to about 600,000.

The low molecular weight component comprises from about 5 to about 83 percent by weight, preferably from about 43 to about 64 percent by weight of the total resin and has a molecular weight (L-MW) from about 10,000 to about 100,000. It is necessary that the ratio of high to medium molecular weight components be greater than or equal to 1.7, while the ratio of medium to low molecular weight components be greater than or equal to 1.7. The density of the total resin must fall in the range of from about 0.940 to about 0.970 and the melt index as measured by the ASTM-1238 method under a 2.16 kilogram load must range from about 0.01 to about 2.0.

Utilizing the resins of the present invention it was unexpectedly found that the addition of more than 10% of the highest molecular weight component did not drop the melt index to unacceptable levels, nor did the measure of flowability (viscosity at 200 reciprocal seconds or 200 sec$^{-1}$ hereinafter VIS200) rise to unacceptably high levels. It was unexpectedly found that weight percents of the high molecular weight component above 12% by weight, and preferably 16% by weight, of the total composition actually increased the flowability (lowered the viscosity) at higher shear rates at a constant overall blend melt index. Therefore the VIS200 value is a close approximation of the extrusion rate of the resin blend, such that a lower VIS200 value indicates a higher extrusion rate can be expected. Thus it is apparent that this particular combination of resin components greatly improved processing properties over those properties provided by resins of the prior art.

Utilizing the materials of the present invention in blow molding applications, melt strength can be enhanced by adding more than 12% of the high molecular weight component. Good melt strength is a known and desirable property of blow molding resins. Weight swell of the three component blend of the present invention can be increased as desired by addition of high molecular weight components at levels greater than 12%.

Further, the uniformity of the resins of the present invention are at least as good as those of the prior art wherein high molecular weight components range from 0 to 10 percent by weight. This uniformity is not expected from the teachings of the prior art as evidenced by U.S. Pat. No. 4,336,352.

The method of preparing polyethylene blends of the present invention is not critical so long as the target properties are acquired. The three component blend can be prepared in reactors in series mode, reactors in parallel mode, or a combination of such modes. The series reaction is one in which the catalyst particles successively pass through three or more reactors operating under different conditions in which the three components are prepared and is the preferred method of the present invention. This results in polymer particles which, in general, contain some of each of the three components, and such a process is generally described in U.S. Pat. No. 3,392,213.

Catalysts useful of the present invention are Ziegler/Natta catalysts, which provide excellent esthetic properties such as color and odor as compared to chromium based catalysts, and which in the past have had difficulty in matching the processing properties of resins produced using chromium based catalysts. Ziegler/Natta catalysts are described in detail in *Ziegler/Natta Catalysts & Polymerizations*, John Boor, Jr., Academic Press, (1979). Suitable Ziegler/Natta catalysts and the Ziegler/Natta catalysts used in all experimental results described in this specification are described in U.S. Pat. Nos. 3,907,759; 4,223,118 and European Patent Application No. 68,200.

Resins of the present invention are most conveniently prepared in series mode reactors in which the total reaction medium is passed from reactor to reactor and the product recovered therefrom. Preferably catalyst is added only to the first reactor.

The invention is more concretely described with reference to the examples below wherein all parts and percentages are by weight unless otherwise specified.

The examples are provided to illustrate the present invention and not to limit it.

The examples as presented contain certain symbols and terms as well as methods for calculating values which are believed well known in the art but which are described here for convenience.

$MI_2$ is melt index as measured according to ASTM D-1238 under a load of 2.16 kilograms.

$MI_{20}/MI_2$ denotes the quotient obtainable by dividing the value of the melt index measured under a load of 21.6 kilograms by the value obtained measuring a melt index under 2.16 kilograms. $MI_{20}/MI_2$ measures the broadness of the polyethylene molecular weight distribution with larger values implying broader molecular weight distributions.

The molecular weight of a component is calculated from the $MI_2$ data by way of the intrinsic viscosity. First, the melt indexes of the components are converted into intrinsic viscosity values by using the relationship.

$$\text{Log } (MI_2) = 1.5112 - 4.986 \times \log [n].$$

This relationship was extablished by a linear regression analysis of a plot of Log ($MI_2$) versus Log [n] over a wide range of melt index values, producing an equation with the high correlation factor of 0.993.

The molecular weight of the component can then be calculated from the intrinsic viscosity value (either measured or calculated using the method described above) by the equation mentioned in the Journal of Polymer Science, volume 36, page 91 (1956) and used in U.S. Pat. No. 4,336,352 namely, $$[n] = 6.8 \times 10^{-4} \times [MW]^{0.67}.$$

Weight swell refers to the thickening of the tube wall which occurs after passage of the polymer through an annular die. Flare swell refers to the increase in the diameter of the tube after being extruded through an annular die. Flare swell percent and tube weights were measured on polymer tubes extruded from an annular die at shear rates above the shear rate of oscillating flow. The tubes were collected at four different shear rates. The flare swell percent at each shear rate is calculated by $$FSP\ (\%) = \frac{D_{extrudate} - D_{outer}}{D_{outer}} \times 100$$

wherein $D_{extrudate}$ is the average tube diameter and $D_{outer}$ is the outer diameter of the annulus. The tube weight is reported as the weight in grams of a 3½ inch length. A reported flare swell percent and tube weight values are obtained from a linear least square fit of the four measured swell properties vs shear rate. The flare swell percent (FSP) and tube weight (TW) are the values obtained at a certain rheometer piston velocity. These tests approximate the flare swell and weight swell observed in commercial processing.

All polymer tubes were produced using a Sieglaff-McKelvey capillary rheometer interfaced to a Tektronix 4052 computer for data collection and analysis. The rheometer was operated in a constant stress mode and melt temperature was 190° C. for all measurements.

The melt viscosity of the resin blends is also measured in the Sieglaff-McKelvey capillary rheometer. The above mentioned viscosity 200 value (or VIS200) is the melt viscosity of the sample as measured on this rheometer at a shear rate of $200S^{-1}$.

Solution-mixed samples were prepared by dissolving polyethylene in hydrocarbon solvent at 140°–150° C., then precipitating the polymer and washing it with isopropanol in a blender.

Melt-mixed samples are prepared in a Brabender Plasticorder TM or a Haake Rheocord Torque Rheometer TM by first stabilizing the resin and then mixing the resin for a time ranging from 10 minutes to 1 hour.

Samples are roll-milled by first stabilizing the resin and then mixing on a roll mill operated with 70 pounds per square inch (psig) steam on the hotter roll for 5–30 minutes.

The $MI_2$ of laboratory blends are calculated based on the composition of the blend according to the *Journal of Polymer Science,* Part A, Volume 2, pages 2977–3007, (1964) which was modified to yield the following equation:

$$(MI_2 \text{ blend})^{-0.248} = \frac{H\ \%}{100\%} (H - MI_2)^{-0.248} + \frac{M\ \%}{100\%} (M - MI_2)^{-0.248} + \frac{L\ \%}{100\%} (L - MI_2)^{-0.248}$$

where H % percentage of the total composition is made up by the high molecular weight component; M % is the percentage of the total composition which consists of the medium molecular weight component; L % is the percentage of the total composition which consists of the low molecular weight component; H-$MI_2$ is the melt index of the high molecular weight component; M-$MI_2$ is the melt index of the medium molecular weight component; L-$MI_2$ is the melt index of the low molecular weight component. The equation was used to calculate the $MI_2$ values for the laboratory blends made according to the present invention.

Three component polyethylene blends were prepared in series generally using the catalyst described in U.S. Pat. Nos. 3,907,759, 4,223,118 and European Patent Application No. 68,200 in the process of U.S. Pat. Nos. 3,392,213 and 4,258,167.

Column crush properties (or topload strength) of bottles, made in an intermittent blow molding machine, are measured by ASTM method D2659 and are reported in pounds.

Drop impact strength of bottles made on an intermittant blow molding machine are measured by ASTM method D2463 and are reported in feet dropped.

Bottle stress crack resistance was measured by ASTM method D2561, except that a slightly higher bottle pressure was used. The values reported are F 50 values and the units are hours. In this test, bottles from a continuous blow molding machine were tested to improve the reproducibility of the test.

EXAMPLE 1

In general, the Ziegler/Natta catalyzed resins and chromium catalyzed resins show different properties with regard to flare swell percent, tube weight and VIS200. Desirable properties are moderate flare swell percent values, a consistent high tube weight and a low VIS200. Table 1 illustrates a catalyst-produced resin made using the catalyst system described in U.S. Pat. Nos. 3,907,759; 4,223,118 and European Patent Application No. 68,200 and a commercially available chromium catalyst-produced resin, (Phillips 5502, trademark of and sold by Phillips Chemical Co.) A comparison of properties of these commercial resins are set forth below.

TABLE 1

|  | Flare Swell Percent | Tube Weight | VIS200 |
| --- | --- | --- | --- |
| Ti-catalyst resin | 43.9 | 1.04 | 1.08 |
| Cr-catalyst resin | 41.9 | 1.34 | 0.96 |

The results shown indicate that the titanium catalyzed resin is deficient in weight swell properties as compared to the chromium catalyzed resin.

EXAMPLE 2

Resin blends were prepared in the laboratory by mixing three single component blends together to form a tri-component blend. The individual components were prepared in laboratory reactors. The mixing was effected by use of a roll mill as described above. Within pairs of samples the low molecular weight melt index (L-MI$_2$) and the ratio of the medium weight to low molecular weight percentages were held constant together with the total blend melt index. The data showed that the weight swell for the resins with more high molecular weight content was consistently higher, while the VIS200 value is consistently lower, as compared to resins with lower high molecular weight content. Both of these changes are useful for producing blow molding resins having excellent properties. The data is set forth in Table 2 below, wherein H-MI$_2$ indicates the MI$_2$ value of the high molecular weight fraction.

TABLE 2

| H % | H—MW | Tube Weight | VIS200 |
| --- | --- | --- | --- |
| 14 | 860,000 | 1.46 | 1.06 |
| 6 | 860,000 | 1.16 | 1.30 |
| 14 | 860,000 | 1.46 | 1.20 |
| 6 | 860,000 | 1.26 | 1.40 |
| 14 | 860,000 | 1.40 | 1.05 |
| 6 | 860,000 | 1.15 | 1.15 |
| 14 | 860,000 | 1.48 | 1.15 |
| 6 | 860,000 | 1.24 | 1.26 |

In each case, the higher H % results in a higher tube weight value and a lower VIS200 value. This would indicate that resins with higher tube weight values (higher weight swell values) and lower VIS200 (enhanced extrusion rates) can be produced at H % values greater than 12%. The higher weight swell values are more comparable to chromium catalyst produced resins established in the market place.

EXAMPLE 3

The samples were generated to prepare resins having high molecular weight levels above 12% dry weight. These samples were prepared both on a laboratory scale and on a large scale in a pilot plant. Weight swell in these samples was increased significantly from the level of currently commercially available titanium catalyzed resins to levels close to those of currently available chromium catalyzed resins, while significantly lowering the VIS200, all by the addition of the high weight percent content levels of the high molecular weight component with constant blend MI$_2$.

TABLE 3

| Sample | H % H—MI$_2$ | FSP (2.5) | TW (2.5) | VIS200 |
| --- | --- | --- | --- | --- |
| A | 13% - 0.0027 | | | |
| Lab |  | 37 | 1.23 | 0.87 |
| Pilot Plant |  | 51 | 1.21 | 0.94 |
| B | 23.4% - 0.0027 | | | |
| Lab |  | 42 | 1.30 | 0.83 |
| Pilot Plant |  | 47 | 1.37 | 0.79 |
| C | 18% - 0.01 | | | |
| Lab |  | 42 | 1.26 | 0.84 |
| Pilot Plant |  | 41 | 1.18 | 0.90 |
| Ti-catalyst resin |  | 44 | 1.04 | 1.08 |
| Cr-catalyst resin |  | 42 | 1.30 | 0.96 |

Commercial titanium and chromium catalyzed resins described above are included in Table 3 for comparative purposes. The table shows that the tube weight (TW) and flare swell percent (FSP) are improved significantly over the levels of currently available titanium base resins.

These results indicate that physical properties of resins obtained in the lab agree fairly well with the properties of resins obtained in the pilot plant of the same composition. Thus, the results obtained in the lab constitute commercial scale resin properties.

In these cases, n-hexane was employed as the diluent in these reactors as established in U.S. Pat. No. 4,223,118. The pressures of the three reactors were in the range of 10 to 140 psig. Hydrogen was added to the reactors at such a rate so as to keep the hydrogen to ethylene ratio in the vapor space below 0.15. Temperatures in the reactors ranged from 55°-90° C. Varying amounts of 1-butene were added to some of the reactors to control the density. These conditions typically produced resins like those given in the tables below. Table 4 gives the compositions of the three samples while Table 5 briefly details the processing properties, as measured by laboratory tests, along with physical properties (topload and drop impact strength) of bottles blown on intermittent blow molding equipment. ESCR was determined on bottles made on continuous blow molding equipment instead of intermittent blow molding machines because they yielded more reproducible data and were less dependent upon the processing conditions of bottle preparation.

In addition, two chromium based resins were tested for comparative purposes, one (K) is made by Soltex Polymer Corp. while the other (L) is made by Chemplex Co.

TABLE 4

| Sample | H % | H—MW | M % | M—MW | L % | L—MW |
| --- | --- | --- | --- | --- | --- | --- |
| H | 20 | 642,000 | 33 | 134,000 | 47 | 67,500 |
| I | 21 | 600,000 | 26 | 244,000 | 53 | 67,500 |
| J | 18 | 860,000 | 34 | 106,000 | 48 | 55,000 |

TABLE 5

| Sample | MI$_2$ | MI$_{20}$/MI$_2$ | Density (g/cc) | Flare Swell Percent | Tube Weight g | Vis 200 | Topload Strength (lbs) | Drop Impact Strength (lbs) | Bottle SCR (hr) |
|---|---|---|---|---|---|---|---|---|---|
| H | 0.51 | 99 | 0.958 | 47 | 1.47 | 0.77 | 66.3 | 13.4 | 14 |
| I | 0.47 | 89 | 0.958 | 54 | 1.31 | 0.84 | 68.3 | 16.3 | 11.8 |
| J | 0.38 | 71 | 0.957 | 52 | 1.28 | 1.1 | 68.6 | 32+ | 19.2 |
| K | 0.40 | 88 | 0.954 | 41 | 1.26 | 0.93 | 56.6 | 17.1 | 5.0 |
| L | 0.39 | 95 | — | 41 | 1.29 | 0.91 | 58.2 | 12.5 | 8.3 |

While certain embodiments and details have been shown for the purpose of illustrating this invention, it will be apparent to those skilled in this art that various changes and modifications may be made herein without departing from the spirit or scope of the invention.

We claim:

1. Intermittent blow-molding processes using polyethylene resins prepared via Ziegler/Natta catalysts comprising high molecular weight, medium molecular weight and low molecular weight fractions, wherein
   (A) The viscosity average molecular weight of high molecular weight component (H-MW) ranges from 590,000 to about 860,000 and comprises from 12 to about 25 percent by weight of the total resin;
   (B) The viscosity average molecular weight of the medium molecular weight component (M-MW) is from about 75,000 to about 600,000 and comprises from about 5 to about 83% by weight of the total resin;
   (C) The viscosity average molecular weight of the low molecular weight component (L-MW) is from about 10,000 to about 100,000 and comprises from about 5 to about 83% by weight of the total resin; wherein
   (D) The ratio of H-MW/M-MW is ≧1.7 and the ratio of M-MW/L-MW is ≧1.7, wherein the density of the total resin is from about 0.940 to about 0.970 and the melt index at 2.16 kilogram load is from about 0.01 to about 2.0.

2. A process as described in claim 1 wherein the resin contains polyethylene copolymer in any or all of (A) (B) and (C), said copolymer formed from ethylene and a comonomer containing from 3 to 12 carbon atoms, and wherein (A) has a molecular weight of 660,000 to 775,000.

3. A process as described in claim 2 wherein (A) is from 16 to 22% by weight of the total resin.

4. A process as described in claim 3 wherein component (B) comprises from about 20 to about 35% by weight of the total resin.

5. A process as described in claim 4 wherein component (C) comprises from about 43 to about 64% by weight of the total resin.

6. A process as described in claim 5 wherein the density of the total resin ranges from about 0.950 to about 0.960.

7. A process as described in claim 6 when prepared utilizing Ziegler/Natta catalysts based on titanium, vanadium or mixtures of these.

* * * * *